UNITED STATES PATENT OFFICE.

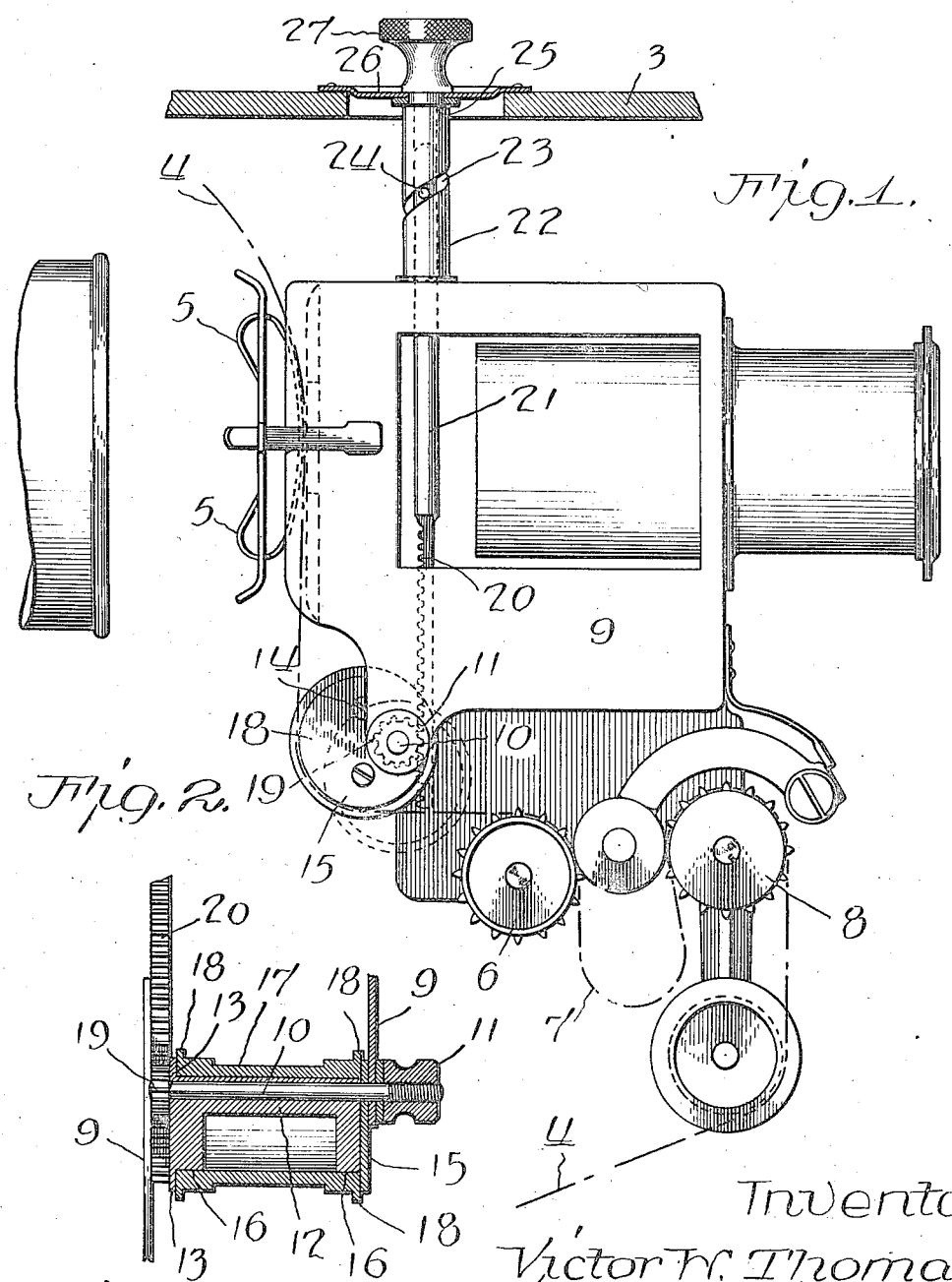

VICTOR W. THOMAS, OF CHICAGO, ILLINOIS, ASSIGNOR TO C. L. PEYTON, OF CHICAGO, ILLINOIS.

CINEMATOGRAPH.

1,229,673.      Specification of Letters Patent.    Patented June 12, 1917.

Application filed June 26, 1916. Serial No. 105,790.

*To all whom it may concern:*

Be it known that I, VICTOR W. THOMAS, a citizen of the United States, and a resident of the city of Chicago, county of Cook, and State of Illinois, have invented certain new and useful Improvements in Cinematographs, of which the following is a specification.

My present invention relates to improvements in cinematographs and has special reference to the provision of a simple but improved framing device for such a machine. As is well known, great attention has to be given to reducing, as far as possible, the jump in the display of motion pictures. Some jump is probably unavoidable in displaying the successive views, but this may be much reduced by properly designed and carefully built mechanism, which will do away with all unnecessary pull upon the film, and which will have a minimum of play between the moving parts.

I believe the hereinafter illustrated and described mechanism for properly framing the view, while simple in construction, will permit of an accurate framing of the picture, will remain rigidly in adjusted position, will occasion a minimum additional pull upon the film, and may be made so as to have no, or at least a negligible amount of, play or movement, which would otherwise show as an enhanced movement or jump in the displayed picture.

I attain the above objects by means of the mechanism illustrated in the accompanying drawing, in which,—

Figure 1 is a fragmental view of a cinematograph mechanism with my new framing device assembled therewith.

Fig. 2 is an axial section through the roller member of the framing device.

The cinematograph mechanism is mounted in a suitable case, only a portion of the top, 3, of which is shown in the drawing. The film, 4, coming from a magazine (not shown) passes before the light aperture to which it is usually held by suitable spring or tensioning devices, 5. From the tensioning devices and light aperture, the film is carried to a driven sprocket, 6, which is usually intermittent in its action, and from thence it is usually looped as at 7, and passed to a continuously driven sprocket, 8, and then to suitable takeup devices (not shown).

My new framing mechanism is preferably located between the light aperture and tensioning devices and the sprocket, 6, which draws the film therefrom and is adapted to extend into the film path. The framing device is constructed as follows:—

Transversely of the film path, and preferably mounted in suitable apertures in the side members, 9, 9, of the frame in which the other portions of the cinematograph mechanism are mounted, is an arbor, 10. One end of the arbor, 10, is threaded and passed through one of the side members, 9, so as to receive the nut, 11, for a purpose hereafter to be mentioned.

Upon the arbor, 10, is rigidly mounted an eccentrically bored spool, 12, having a radially extending flange, 13, upon one end thereof. Upon the opposite end of the spool, 12, is secured by means of suitable screws, 14, a plate, 15, the periphery of which extends beyond the face of the spool to form a flange similar to the flange, 13, upon the other end of the spool. The central portion of the spool, 12, may be reduced or cut away to save weight, but adjacent the flange, 13, and the plate, 15, are alining bearing paths, 16, 16, upon which and between the said flange, 13, and plate, 15, is mounted, so as to easily rotate thereon, the wheel or pulley, 17, having at either end the flanges, 18, 18, to guide the film. It will be seen that the provision of the bearing paths, 16, 16, of relatively large diameter permits the attainment of a free but extremely even rotation of the pulley, 17.

In order to rotate the spool, 12, and thereby alter the relation of the pulley, 17, to the film pathway, I secure to the arbor, 10, a spur gear, 19, which is adapted to coact with a rack, 20, upon the lower end of a rod, 21, which is preferably extended vertically toward the top, 3, of the cinematograph casing. The top of the rod, 21, extends into the bore of a member, 22, which is spirally slotted as at 23, and a pin, 24, is provided upon the rod to extend into and coact with said spiral slot. The top of said member, 22, is reduced to form the shoulder, 25, and the reduced portion is passed through a bearing plate, 26, secured to the top, 3, of the cinematograph casing, and upon the outer reduced end of the member, 22, is secured the milled or knurled nut, 27.

It will now be seen that a turn of the nut, 27, will rotate the member, 22, which through the coaction of the spiral slot, 23, and the pin, 24, will raise or depress the rod, 21, which through the interaction of the rack, 20, and spur gear, 19, will rotate the arbor, 10, and the spool, 12, secured thereto, thereby changing the relation of the freely rotating pulley, 17, to the film pathway and thus effecting a framing of the picture.

The ease of rotation of the arbor, 10, in the apertures of the side members, 9, 9, may be adjusted by turning the milled nut, 11, or by turning the nut, 11, sufficiently the arbor, 10, and spool, 12, may be frictionally locked in the desired position.

What I claim is:—

1. In a cinematograph having a film pathway, means for moving film through said pathway, an arbor disposed transversely of and adjacent said pathway, a spool eccentrically mounted upon said arbor, a pulley rotatably mounted upon said spool, and means for rotatably adjusting said spool relative to its axis.

2. In a cinematograph having a film pathway, means for moving film through said pathway, an arbor disposed transversely of and adjacent said pathway, a spool eccentrically mounted upon said arbor, a pulley rotatably mounted upon said spool, and means for rotatably adjusting said spool relative to its axis comprising a gear fixed to said arbor, a rack bar coacting with said gear, a rotatable sleeve having a spiral slot therein, and a pin upon said rack bar adapted to coact with said spiral slot.

3. In a cinematograph a film pathway, means for moving film therethrough, an eccentrically journaled roller adapted to be engaged by the film between said pathway and said film moving means, and devices for rotating the journal of said roller including a pinion on said journal, a reciprocable rack bar engaging said pinion, and means for reciprocating said rack.

4. In a cinematograph a film pathway, means for moving film therethrough, an eccentrically journaled roller adapted to be engaged by the film between said pathway and said film moving means, and devices for rotating the journal of said roller including a pinion on said journal, a reciprocable rack bar engaging said pinion, and a rotatable sleeve telescopically engaging said rack bar, and means operatively connecting said rack bar and sleeve whereby the rotation of the latter is adapted to reciprocate said rack bar.

Signed at Chicago, county of Cook and State of Illinois, this 18th day of May, 1916.

VICTOR W. THOMAS.

Witnesses:
WM. HAROLD EICHELMAN,
JAMES A. THOMAS.